Aug. 4, 1959 J. FEWSTER 2,898,148
TIPPING CARRIER FOR ATTACHMENT TO A TRACTOR OR SIMILAR VEHICLE
Filed July 16, 1954 2 Sheets-Sheet 1
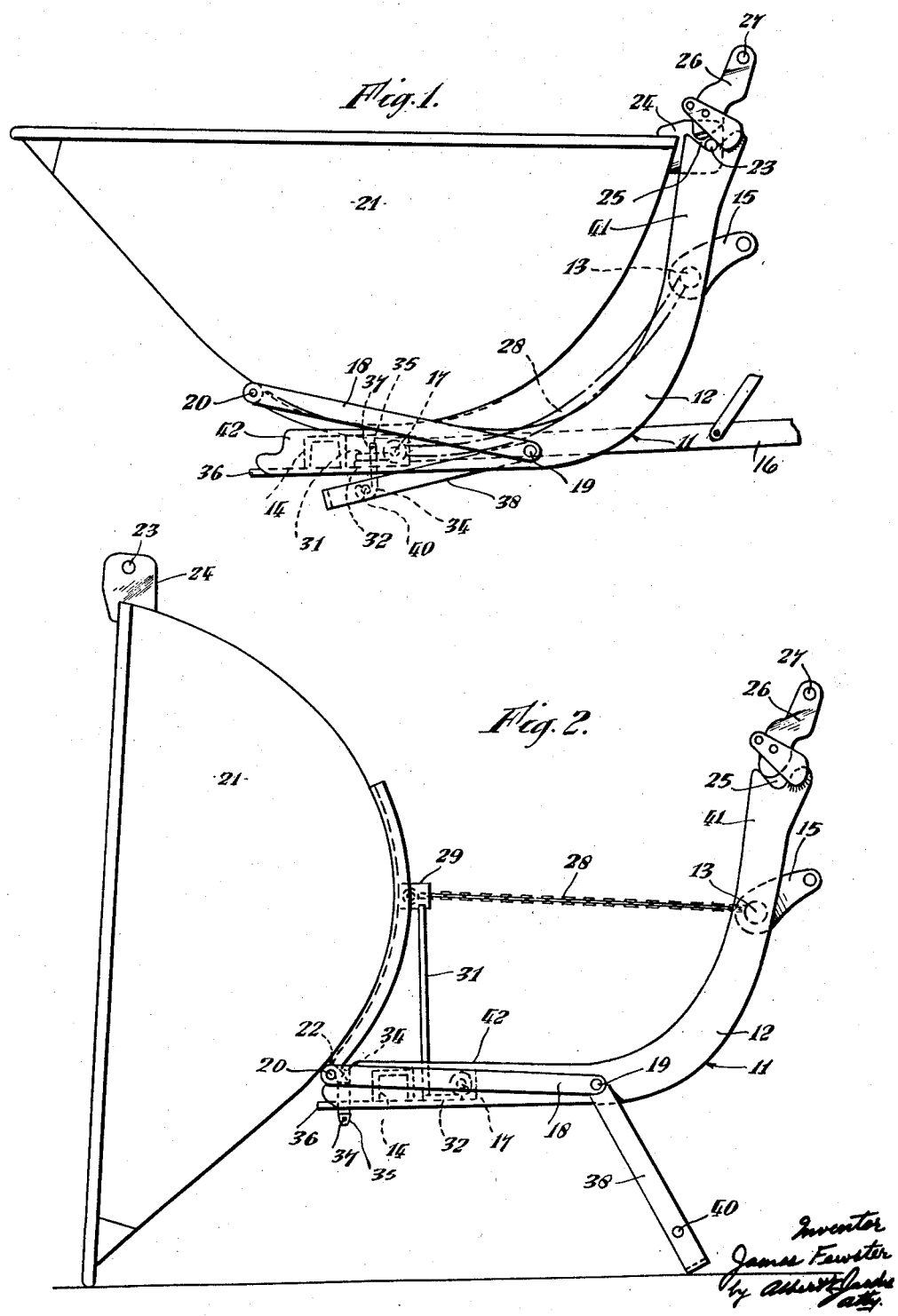

Aug. 4, 1959   J. FEWSTER   2,898,148
TIPPING CARRIER FOR ATTACHMENT TO A TRACTOR OR SIMILAR VEHICLE
Filed July 16, 1954   2 Sheets-Sheet 2

Inventor
James Fewster
by Albert J Jacks
atty.

United States Patent Office 2,898,148
Patented Aug. 4, 1959

2,898,148

TIPPING CARRIER FOR ATTACHMENT TO A TRACTOR OR SIMILAR VEHICLE

James Fewster, Hexham, Northumberland, England, assignor to Fewsters (Stocksfield) Limited, Hexham, Northumberland, England, a company of Great Britain and Northern Ireland Application July 16, 1954, Serial No. 443,933

Claims priority, application Great Britain July 16, 1953

7 Claims. (Cl. 298—17)

This invention relates to, and has for its object to provide an improved tipping carrier which can be readily attached to and detached from a tractor or similar vehicle, which includes a pair of trailingly pivoted draft links at the rear adapted to be raised and lowered by a hydraulic power unit, and also includes a coupling pin located above said draft links, the coupling pin and the rear ends of the draft links forming a three-point attachment for implements.

A tipping carrier according to my invention comprises a frame adapted to be temporarily attached to the rear of a tractor or similar vehicle of the kind above referred to, said frame supporting a receptacle which has a rolling action about a transverse axis and is capable of tipping thereabout to discharge its contents rearwardly when required, the said frame being provided with a lug or lugs adapted to be engaged by the said coupling pin on the rear of said tractor, and also being provided with pins adapted to be engaged by the ends of the said draft links on said tractor, the attachment of said draft links to said pins enabling the carrier to be moved from a detached position at rest on the ground or other supporting surface to a transportable position where it is wholly supported by the tractor. Normally the tipping receptacle is retained in a substantially horizontal position by catches which can be released at will, and a spring or springs is or are or may be provided to assist in returning the receptacle towards said horizontal position after it has tipped its load, the catches automatically re-engaging receptacle.

One embodiment of the invention is illustrated in the accompanying drawings, wherein:

Fig. 1 is a side elevation with the receptacle in the loading and substantially horizontal position;

Fig. 2 is a side elevation with the receptacle in the detached parked position;

Figure 3:
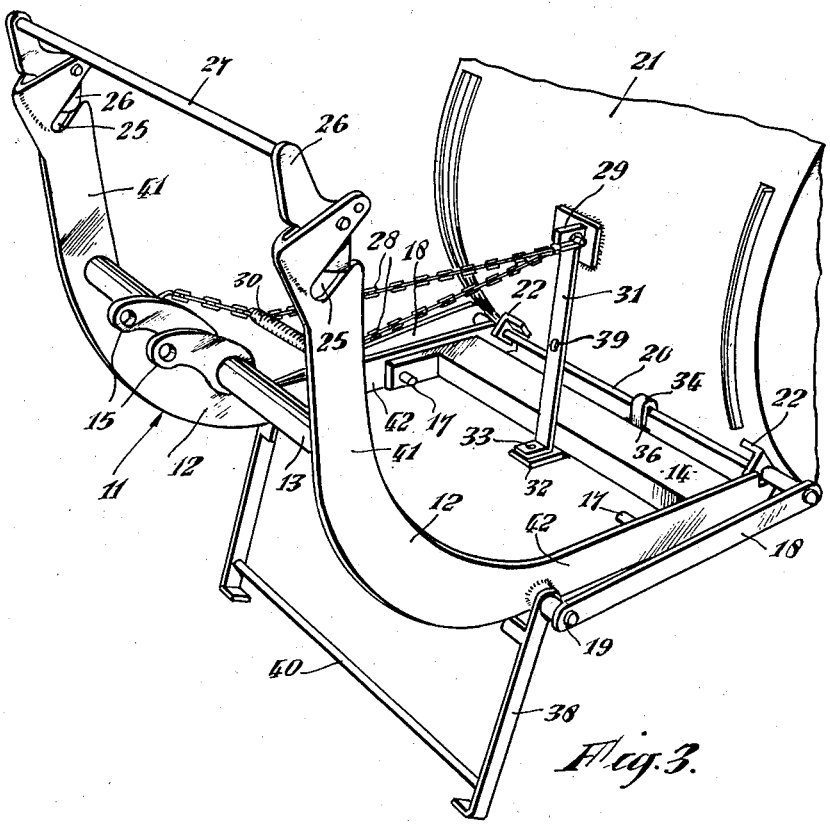
Fig. 3 is a perspective view, also with the receptacle in the detached parked position.

The carrier attachment illustrated is particularly intended for use with a tractor of standard pattern sold under the registered trademark "Ferguson" which includes a pair of trailingly pivoted draft links at the rear adapted to be raised and lowered by a hydraulic power unit, and also includes a coupling pin located above said draft links, the coupling pin and the rear ends of the draft links forming a three point attachment for implements. The attachment consists of a frame 11 comprising a pair of L-shaped side members 12 united by cross members 13, 14. The cross member 13 between the upstanding arms 41 of the members 12 is provided with a pair of central lugs 15 adapted to engage the transversely-projecting ends of the pin on the central casing of the rear axle of the tractor, and a pair of transverse inwardly-projecting pins 17 are provided on the rearwardly-projecting and substantially horizontal arms 42 of the members 12 to receive the rearwardly projecting draft links 16 of the tractor. The attachment of the pins 17 to the draft links and the engagement of the lugs 15 make a three point attachment to the tractor. The L-shaped frame 11 can thus be readily attached to and supported at the rear of the tractor and its rearwardly-projecting arms 42 are provided with a pair of link members 18, pivoted thereto at 19, which support between them a transverse spindle 20. The receptacle 21, which is of rectangular scoop shape, is pivoted between said members 18 and is provided with lugs 22 on its inclined rear wall which engage said spindle 20. Pins 23 provided on lugs 24 at the upper ends of the forward wall of the receptacle 21 engage in notches 25 in the upper ends of the upstanding arms 41 of the frame members 12 and are normally retained therein by pivoted catches 26 coupled together by a cross bar 27 so that they can be simultaneously disengaged by hand from said pins. Two flexible tension members such as chains 28 are both connected by one end of each to a lug 29 on the receptacle 21, and their other ends are spaced apart and connected to the opposite frame members 12 in the region of the cross bar 13 so that normally, when the receptacle is in the tipping position, the two chains tend to assume, together with the cross bar 13, a triangular formation. A helical tension spring 30 is disposed between and connected by its ends to the two chains 28 so that the spring tends to draw the two chains together. By this arrangement the chains tend to draw the receptacle 21 into, and retain it in the substantially horizontal position, but the spring 30 is not of sufficient strength to prevent the loaded receptacle tipping about its transverse spindle 20 when the pivoted catches 26 are raised to free the pins 23 on the forward wall of the receptacle 21. The spring however tends automatically to return the receptacle towards the horizontal position after tipping and facilitate the re-engagement of said pins 23 in the notches 25 to retain the receptacle in position for loading.

When the receptacle 21 moves into its loading, substantially horizontal position, its curved bottom wall rolls on the top edges of the rearwardly extending, substantially horizontal arms 42 of the frame members 12 and the spindle 20 rises, the members 18 pivoting about the pivots 19, as seen in Fig. 1.

To facilitate connecting, or disconnecting, the carrier from the tractor, the receptacle is moved into its vertical position, shown in Figs. 2 and 3. To support the receptacle in said position, a loose strut 31 is disposed between the lug 29 and a lug 32 on the cross bar 14 of the frame, a pin 33 on one end of the strut engaging a hole in the lug 32, whilst a notch 43 in the other end of the strut is engaged by the edge of the lug 29. A hook 34 is passed, shank 35 upwards, through a hole in another lug 36 on the cross bar 14, and a lynch pin 37 passed through the upper end of the shank 35 prevents the hook dropping out of the lug 36. The hook 34 engages the spindle 20. The hook 34, together with the strut 31, retain the receptacle in the vertical position. A stand 38 also is pivotally mounted on the pivot pins 19 and enables the carrier to be supported when disconnected from the tractor, or during the process of connecting it to the tractor. When the receptacle is held in the vertical position as described above it co-operates with the stand 38 to form a rigid structure.

The carrier is connected to the tractor by backing the latter up so that the free ends of its draft links 16 can be engaged with the pins 17. The links are then raised whereupon the frame 12 lifts a little at the front and the carrier pivots rearwardly about its lower edge on the ground and brings the lugs 15 about level with the coupling pin on the central casing of the rear axle of the tractor. The stand 38 can then be folded rearwardly out of the way. By rocking the frame 12 about the pins 17, it will be found that a single operative can engage the coupling pin with the lugs 15 and can then readily swing the receptacle by hand into its horizontal position so that the pins 23 on the receptacle can be engaged with the notches 25 in its frame members. If desired, a single lug may be substituted for the pair of lugs 15.

Figure 4:
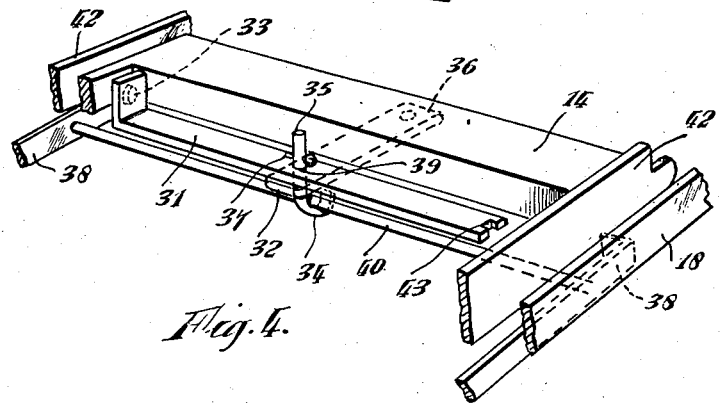
Fig. 4 is a fragmentary perspective view of a detail.

When connection of the carrier to the tractor is completed, the strut 31 and hook 34 are removed to allow the receptacle 21 to move to the horizontal loading position. Before the receptacle is returned to the horizontal position, the strut 31 is laid loosely, horizontally, on the lug 32, and the shank 35 of the hook 34 is passed upwards through the hole in the lug 32 and a hole 39 in the centre of the strut, the lynch pin 37 being placed through the shank above the strut, with the hook 34 below the lug 32 (Fig. 4). When the stand 38 is out of use it is retained in a horizontal position by a transverse bar 40 thereon being engaged by the suspended hook 34 (Figs. 1 and 4).

While I have described my tipping carrier as being hand operated and returned by a spring, it will be understood that the carrier may be power operated, for example by a hydraulic ram, by cantilever or by power lift arms actuated by the hydraulic system of the tractor.

By my invention I provide an attachment for a tractor or similar vehicle comprising a frame and a balanced tipping receptacle which can be readily attached to and detached from the rear of a tractor and which forms a useful means for carrying a load, for example, of concrete, sand or similar loose material and tipping it where required.

What I claim and desire to secure by Letters Patent is:

1. A tipping carrier comprising a frame constituting a support for a receptacle, a receptacle supported thereby, means for mounting said receptacle on the frame for rolling action of the receptacle on the frame and for tipping movement of the receptacle with respect to one end of said frame, at least one lug mounted on said frame near one end thereof and projecting in a direction away from said receptacle, and pins mounted in said frame near the other end thereof and projecting transversely inwardly with respect to the frame, said tipping carrier being adapted to be attached to and detached from a tractor or similar vehicle provided with members for connection and disconnection with the lug and pins aforesaid, whereby the carrier can be moved from a detached position at rest on the support to a transportable position in which it is wholly supported by the tractor.

2. A tipping carrier comprising a frame constituting a support for a receptacle, a receptacle supported thereby, means for mounting said receptacle on the frame for rolling action of the receptacle on the frame and for tipping movement of the receptacle with respect to one end of said frame, at least one lug mounted on said frame near one end thereof and projecting in a direction away from said receptacle, and pins mounted in said frame near the other end thereof and projecting transversely inwardly with respect to the frame, said tipping carrier being adapted to be attached to and detached from a tractor or similar vehicle provided with members for connection and disconnection with the lug and pins aforesaid, whereby the carrier can be moved from a detached position at rest on the support to a transportable position in which it is wholly supported by the tractor, said frame comprising a pair of spaced L-shaped side members and cross bars rigidly connecting the side members to each other, said side members each having an upwardly extending substantially vertical arm and a rearwardly extending substantially horizontal arm to form a cradle for the receptacle.

3. A tipping carrier comprising a frame constituting a support for a receptacle, a receptacle supported thereby, means for mounting said receptacle on the frame for rolling action of the receptacle on the frame and for tipping movement of the receptacle with respect to one end of said frame, at least one lug mounted on said frame near one end thereof and projecting in a direction away from said receptacle, and pins mounted in said frame near the other end thereof and projecting transversely inwardly with respect to the frame, said tipping carrier being adapted to be attached to and detached from a tractor or similar vehicle provided with members for connection and disconnection with the lug and pins aforesaid, whereby the carrier can be moved from a detached position at rest on the support to a transportable position in which it is wholly supported by the tractor, said frame comprising a pair of spaced L-shaped side members, cross bars rigidly connecting the side members to each other, said side members each having an upwardly extending substantially vertical arm and a rearwardly extending substantially horizontal arm to form a cradle for the receptacle, a pair of link members one end of each of which is pivotally connected to said rearwardly extending arms and between the other ends of which the receptacle is pivoted.

4. A tipping carrier comprising a frame constituting a support for a receptacle, a receptacle supported thereby, means for mounting said receptacle on the frame for rolling action of the receptacle on the frame and for tipping movement of the receptacle with respect to one end of said frame, at least one lug mounted on said frame near one end thereof and projecting in a direction away from said receptacle, and pins mounted in said frame near the other end thereof and projecting transversely inwardly with respect to the frame, said tipping carrier being adapted to be attached to and detached from a tractor or similar vehicle provided with members for connection and disconnection with the lug and pins aforesaid, whereby the carrier can be moved from a detached position at rest on the support to a transportable position in which it is wholly supported by the tractor, said frame comprising a pair of spaced L-shaped side members and cross bars rigidly connecting the side members to each other, said side members each having an upwardly extending substantially vertical arm and a rearwardly extending substantially horizontal arm to form a cradle for the receptacle, and cooperating latching means and engaging pins on the upper ends of the upwardly extending arms and the receptacle to retain the receptacle in loading position when the pins are engaged by the latching means.

5. A tipping carrier comprising a frame constituting a support for a receptacle, a receptacle supported thereby, means for mounting said receptacle on the frame for rolling action of the receptacle on the frame and for tipping movement of the receptacle with respect to one end of said frame, at least one lug mounted on said frame near one end thereof and projecting in a direction away from said receptacle, and pins mounted in said frame near the other end thereof and projecting transversely inwardly with respect to the frame, said tipping carrier being adapted to be attached to and detached from a tractor or similar vehicle provided with members for connection and disconnection with the lug and pins aforesaid, whereby the carrier can be moved from a detached position at rest on the support to a transportable position in which it is wholly supported by the tractor, said frame comprising a pair of spaced L-shaped side members, cross bars rigidly connecting the side members to each other, said side members each having an upwardly extending substantially vertical arm and a rearwardly extending substantially horizontal arm to form a cradle for the receptacle, a pair of link members one end of each of which is pivotally connected to said rearwardly extending arms and between the other ends of which the receptacle is pivoted, and a stand member pivotally connected at its upper end to the frame at the pivots of said links to said arms, whereby the pins on the frame of the carrier which are adapted to be engaged by the tractor are supported at a level sufficiently raised to permit said engagement, the lower end of the stand being adapted to rest on the ground and to cooperate with the edge of the receptacle to support the carrier when the latter is disconnected from the tractor.

6. A tipping carrier comprising a frame constituting a support for a receptacle, a receptacle supported thereby, means for mounting said receptacle on the frame for rolling action of the receptacle on the frame and for tipping movement of the receptacle with respect to one end of said frame, at least one lug mounted on said frame near one end thereof and projecting in a direction away from said receptacle, and pins mounted in said frame near the other end thereof and projecting transversely inwardly with respect to the frame, said tipping carrier being adapted to be attached to and detached from a tractor or similar vehicle provided with members for connection and disconnection with the lug and pins aforesaid, whereby the carrier can be moved from a detached position at rest on the support to a transportable position in which it is wholly supported by the tractor, said frame comprising a pair of spaced L-shaped side members, cross bars rigidly connecting the side members to each other, said side members each having an upwardly extending substantially vertical arm and a rearwardly extending substantially horizontal arm to form a cradle for the receptacle, a pair of link members one end of each of which is pivotally connected to said rearwardly extending arms and between the other ends of which the receptacle is pivoted, and a stand member pivotally connected at its upper end to the frame at the pivots of said links to said arms, whereby the pins on the frame of the carrier which are adapted to be engaged by the tractor are supported at a level sufficiently raised to permit said engagement, the lower end of the stand being adapted to rest on the ground and to cooperate with the edge of the receptacle to support the carrier when the latter is disconnected from the tractor, a removable strut disposed between the frame and the receptacle to retain the receptacle in a vertical position, and a hook member removably attached to the frame and the receptacle to restrain relative frame and receptacle movement.

7. A tipping carrier comprising a frame constituting a support for a receptacle, a receptacle supported thereby, means for mounting said receptacle on the frame for rolling action of the receptacle on the frame and for tipping movement of the receptacle with respect to one end of said frame, at least one lug mounted on said frame near one end thereof and projecting in a direction away from said receptacle, and pins mounted in said frame near the other end thereof and projecting transversely inwardly with respect to the frame, said tipping carrier being adapted to be attached to and detached from a tractor or similar vehicle provided with members for connection and disconnection with the lug and pins aforesaid, whereby the carrier can be moved from a detached position at rest on the support to a transportable position in which it is wholly supported by the tractor, said frame comprising a pair of spaced L-shaped side members and cross bars rigidly connecting the side members to each other, said side members each having an upwardly extending substantially vertical arm and a rearwardly extending substantially horizontal arm to form a cradle for the receptacle, and cooperating latching means and engaging pins on the upper ends of the upwardly extending arms and the receptacle to retain the receptacle in loading position when the pins are engaged by the latching means, a pair of flexible tension members both of which are connected at one end to a common point on the underside of the receptacle and at the other end to the upwardly extending arms of the frame, and a helical tension spring disposed transversely between said flexible tension members intermediate the ends thereof to facilitate the return of the receptacle to its loading position.

References Cited in the file of this patent

UNITED STATES PATENTS

| | | |
|---|---|---|
| 714,239 | Rhodes | Nov. 25, 1902 |
| 2,464,709 | Orsini | Mar. 15, 1949 |
| 2,546,030 | Grewe | Mar. 20, 1951 |